United States Patent
Lee et al.

(10) Patent No.: US 7,280,172 B2
(45) Date of Patent: Oct. 9, 2007

(54) LIGHT GUIDE PLATE, LIQUID CRYSTAL DISPLAY DEVICE HAVING THE SAME, AND METHOD FOR DISPLAYING AN IMAGE USING THE LIQUID CRYSTAL DISPLAY DEVICE

(75) Inventors: Ik-Soo Lee, Suwon-si (KR); Jin-Baek Kim, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/209,249

(22) Filed: Jul. 31, 2002

(65) Prior Publication Data

US 2003/0025853 A1    Feb. 6, 2003

(30) Foreign Application Priority Data

Aug. 1, 2001  (KR) ................................. 2001-46645
Sep. 29, 2001  (KR) ................................. 2001-61029

(51) Int. Cl.
G02F 1/1335  (2006.01)
F21V 7/04  (2006.01)

(52) U.S. Cl. .................. 349/65; 349/63; 362/603; 362/614; 362/621; 385/901

(58) Field of Classification Search .................. 349/63, 349/64, 65; 385/146, 901; 362/31, 26, 603, 362/614, 621

See application file for complete search history.

(56) References Cited

U.S. PATENT DOCUMENTS 6,323,919 B1 * 11/2001 Yang et al. .................... 349/63
6,665,029 B2 * 12/2003 Kondo et al. ................ 349/113
6,879,355 B1 * 4/2005 Kim ............................. 349/65
2001/0019379 A1 * 9/2001 Ishihara et al. ............... 349/65
2002/0101551 A1 * 8/2002 Akaoka ........................ 349/65
2003/0099118 A1 * 5/2003 Saitoh et al. ............... 362/561

FOREIGN PATENT DOCUMENTS

| JP | 02-203379 | 8/1990 |
|----|-----------|--------|
| JP | 05-264819 | 10/1993 |
| JP | 09-113907 | 5/1997 |
| JP | 10-111413 | 4/1998 |
| JP | 2000-098382 | 4/2000 |

(Continued)

OTHER PUBLICATIONS

"Monthly Display"; (vol. 6, No. 4, p. 57-64) (Apr. 2000).

*Primary Examiner*—David Nelms
*Assistant Examiner*—Michael H. Caley
(74) *Attorney, Agent, or Firm*—Cantor Colburn LLP

(57) ABSTRACT

Disclosed are a light guide plate, a front illumination type liquid crystal display device using the same, and a method for displaying an image therein. A light reflection pattern is formed on a light reflection surface of the light guide plate so as to change an optical distribution and prevent the moiré phenomenon. The light reflection pattern prevents the light from being leaked through a side of the light guide plate, so an effective display area is not divided into a bright area, a boundary area, and a dark area. It is possible to change the optical distribution and to prevent the moiré phenomenon, so the liquid crystal display device can display an image with an improved brightness uniformity.

10 Claims, 18 Drawing Sheets

FOREIGN PATENT DOCUMENTS

| | | |
|---|---|---|
| JP | 2001-023424 | 1/2001 |
| JP | 2001-060409 | 3/2001 |
| JP | 2001-184925 | 7/2001 |
| WO | 00/32981 | 6/2000 |
| WO | WO00/32981 | 6/2000 |

* cited by examiner

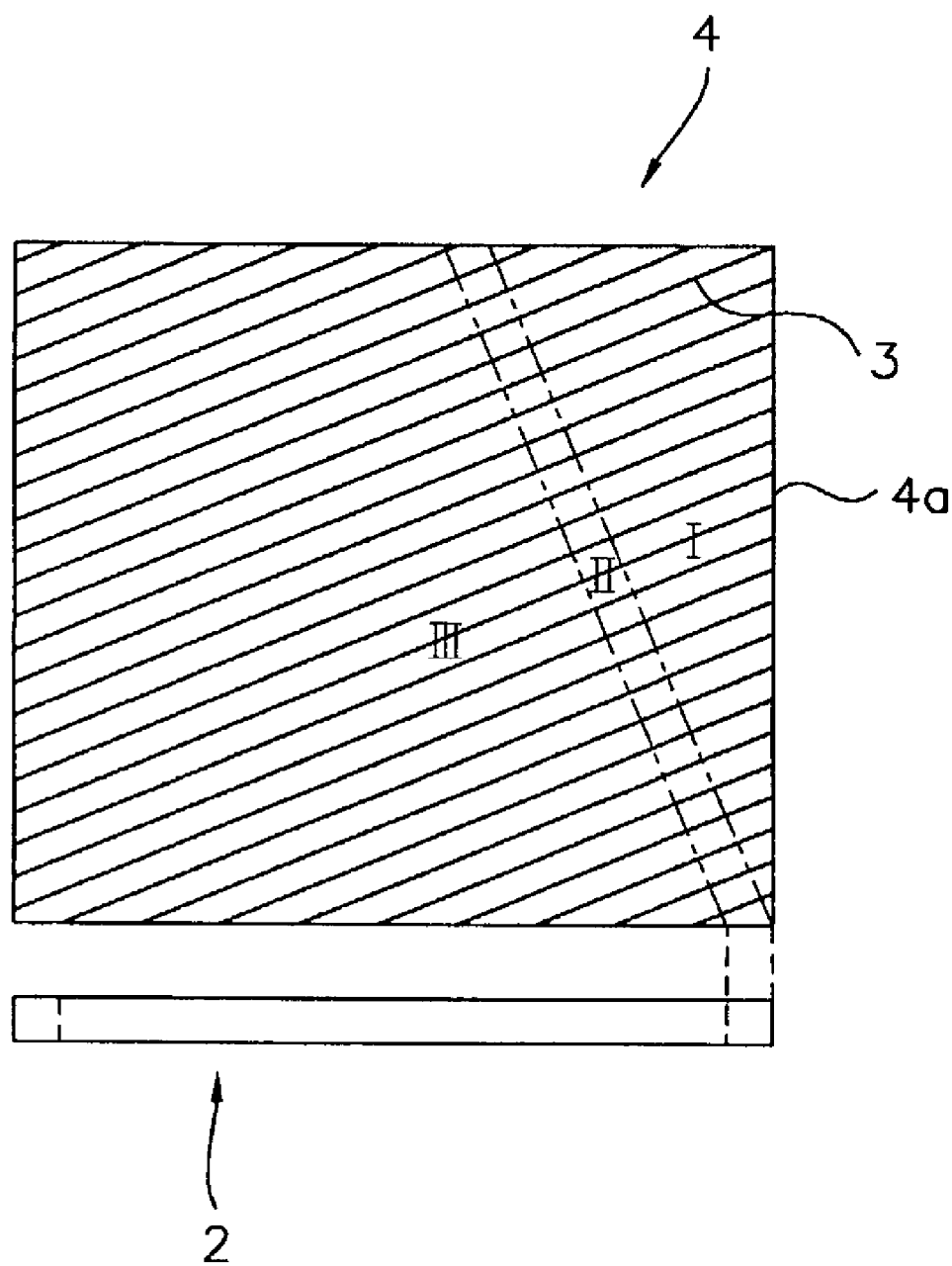

LIGHT GUIDE PLATE, LIQUID CRYSTAL DISPLAY DEVICE HAVING THE SAME, AND METHOD FOR DISPLAYING AN IMAGE USING THE LIQUID CRYSTAL DISPLAY DEVICE

BACKGROUND OF THE INVENTION

1. Field of the Invention

The present invention relates to a liquid crystal display device, and more particularly to a light guide plate, a liquid crystal display device having the same, and a method for displaying pictures using the liquid crystal display device, in which display function is carried out even in a dark place.

2. Description of the Related Art

A liquid crystal display device is one of display devices, which precisely controls a light transmission of a liquid crystal by using electro-optical features of the liquid crystal so as to allow a user to recognize information processed in an information processing unit.

The liquid crystal display devices are generally classified into a reflection type liquid crystal display device and a transmission type liquid crystal display device. The transmission type liquid crystal display device is mainly used for a middle-sized or a large-sized display device and the reflection type liquid crystal display device is mainly used for a small-sized or a middle-sized display device.

Since the reflection type liquid crystal display device displays information by using an external light source, it has a simple structure. In addition, the reflection type liquid crystal display device has low power consumption when displaying information because it can display information with a little power required for controlling a liquid crystal.

Though the reflection type liquid crystal display device has the simple structure and the low power consumption, it does not precisely display information at night or when the quantity of light is insufficient, since the reflection type liquid crystal display device displays information by receiving the light from the exterior thereof.

Such problems can be solved by using the transmission type liquid crystal display device. The transmission type liquid crystal display device generates the light by consuming an electric energy supplied to the transmission type liquid crystal display device. That is, the transmission type liquid crystal display device can create the light required for displaying information by using the electric energy charged therein, so it can freely display information in any place regardless of an external environmental condition.

However, the transmission type liquid crystal display device needs an additional power to generate the light required for displaying information besides the power for controlling the liquid crystal, so the power consumption thereof increases as compared with that of the reflection type liquid crystal display device.

A front illumination type liquid crystal display device solves the problems of the transmission and reflection type liquid crystal display devices and maintains advantages thereof.

The front illumination type liquid crystal display device displays information by using an external light when the external light is sufficient. On the other hand, when the external light is insufficient, the front illumination type liquid crystal display device displays information by using an artificial light, which is generated by consuming the electric energy charged therein. As a result, the front illumination type liquid crystal display device can display information in any place with a reduced power consumption.

FIG. 1 shows a conventional front illumination type liquid crystal display device 10 (hereinafter, simply referred to as "liquid crystal display device").

Referring to FIG. 1, the conventional liquid crystal display device 10 mainly includes a light source 2, a light guide plate 4, and a liquid crystal display panel assembly 6.

Though there are not illustrated in FIG. 1, the liquid crystal display panel assembly 6 includes a liquid crystal display panel having a TFT substrate, a liquid crystal, and a color filter substrate and a driving module.

In detail, common electrodes, to which the power is applied with a same intensity, and R.G.B pixels are formed on the color filter substrate. A plurality of pixel electrodes each having a micro surface area, signal lines for supplying a power to each pixel electrode with a different intensity, and thin film transistors are formed on the TFT substrate. The liquid crystal is injected between the color filter substrate and the TFT substrate.

A driving module is provided to process data applied from an external information processing unit. The driving module sends the processed data to the signal lines formed on the TFT substrate, so as to display information.

The liquid crystal display panel assembly 6 has a structure adapted for individually controlling the power outputted from each thin film transistor. The liquid crystal display panel assembly 6 can individually control the intensity of power applied to pixel electrodes connected to each thin film transistor. Consequently, the liquid crystal display panel assembly 6 precisely controls the alignment of the liquid crystal by a microscopic area unit based on the difference of the electric field between the pixel electrodes and common electrodes.

Though it is possible to precisely control the alignment of the liquid crystal by the microscopic area unit, a light source as shown in FIG. 1 is required for generating the light, because the liquid crystal display device does not display information without the light.

It is preferable that the light supplied to the liquid crystal display panel assembly 6 does not represent a brightness variation within a predetermined area, just like sunlight. However, it is very difficult to manufacture the light source having the brightness distribution similar to that of the sunlight, so a linear light source or a point light source which has a high brightness and can be simply manufactured is used for the light source.

Though the linear light source or the point light source is easily manufactured and has a higher local brightness, the brightness distribution thereof varies depending on a distance between the light source and a position which the incident light reaches. Therefore, if the light generated from the linear light source or the point light source is directly supplied to the liquid crystal display panel assembly, it is impossible to obtain a desired image due to the brightness variation even when the liquid crystal is precisely controlled.

For this reason, as shown in FIG. 1, the light guide plate 4 is used for obtaining a surface light source effect, which is similar to the sunlight, from the light generated by the linear light source or the point light source.

The light guide plate 4 has a hexagonal plate shape with a thin thickness, which corresponds to the shape of an effective display area of the liquid crystal display device 10.

The light guide plate 4 receives the light having an optical distribution densely focused in an area remarkably narrower than the effective display area, and varies the optical distribution of the light to have a uniform optical distribution over the effective display area. Then, the light guide plate 4 sends the light to the above-mentioned liquid crystal display assembly 6.

FIG. 2 is an enlarged view of "A" portion shown in FIG. 1;

In order to maximize the optical efficiency by reducing the optical loss at the light guide plate 4, a plurality of light reflection patterns 3 in the form of V-shaped grooves are continuously formed on an upper surface of the light guide plate 4.

However, the light reflection patterns 3 formed on the upper surface of the light guide plate 4 to increase the optical efficiency may generate a light interference phenomenon, called "moire phenomenon", depending on the alignment of the pixel electrodes of the liquid crystal display panel assembly 6, which are aligned in a matrix pattern.

In detail, as shown in FIG. 3, when an orientation of the light reflection patterns 3 matches the aligning direction of the pixel electrodes 6a of the liquid crystal display panel assembly 6, two patterns are overlapped with each other so that the moiré phenomenon occurs.

The moiré phenomenon can be reduced by tilting the extending direction of the light reflection patterns 3 from the aligning direction of the pixel electrodes 6a by an angle of 22.5 degrees as shown in FIG. 4A.

However, if the extending direction of the light reflection patterns 3 is tilted from the aligning direction of the pixel electrodes 6a by an angle of 22.5 degrees as shown in FIG. 4A, the effective display area is divided into a bright area III, a dark area I, and a boundary area III, that is, a brightness unbalance phenomenon is created as shown in FIG. 4B.

Referring to FIGS. 1 to 4B, the moving direction of the light generated from the lamp 2 in the form of the linear light source varies depending on the reflection angle of the light with respect to the light reflection patterns 3, so the effective display area can be divided into three areas.

That is, when the light generated from the lamp 2 is reflected from the light reflection patterns 3 and is directed towards the pixel electrodes 6a of the liquid crystal display panel assembly 6, the light reaches the bright area III as shown in FIG. 4B. In this area, the displaying function is carried out with a high brightness.

On the contrary, the light generated from the lamp 2 reaches the dark area I shown in FIG. 4B, when the light is not reflected towards the liquid crystal display panel assembly 6, but reflected towards a side of the light guide plate 4 shown in FIG. 4A and leaked out of the exterior. Therefore, the quantity of light at the pixel electrodes 6a of the liquid crystal display panel assembly 6 is insufficient in the dark area I, so information is displayed in the dark area I with a lowered brightness.

On the other hand, the boundary area II is brighter than the dark area I and darker than the bright area III and has a strip shape with a predetermined width. In the boundary area II, the brightness gradually increases as approaching to the bright area III from the dark area I.

Where the effective display area is divided into three areas, though the moiré phenomenon can be prevented, the brightness non-uniformity is remarkably created in each area due to the brightness variation thereof.

Consequently, where the extending direction of the light reflection pattern 3 formed on the light guide plate 4 matches the aligning direction of the pixel electrodes 6a, the moiré phenomenon is created though the effective display area is not divided into the dark area and bright area. On the contrary, where the extending direction of the light reflection pattern 3 formed on the light guide plate 4 is tilted from the aligning direction of the pixel electrodes 6a, the brightness non-uniformity phenomenon is created in the effective display area, though the moiré phenomenon can be reduced.

SUMMARY OF THE INVENTION

The present invention provides a light guide plate capable of preventing the moiré phenomenon and uniformly forming a brightness through out an entire effective display area when displaying in a liquid crystal display device.

Also, the present invention provides a liquid crystal display device capable of reducing a brightness unbalance in an entire effective display area with preventing the moiré phenomenon.

Further, the present invention provides a method for displaying an image in a liquid crystal display device, capable of reducing a brightness unbalance in an entire effective display area with preventing the moiré phenomenon.

In one aspect, there is provided a light guide plate comprising a body including a side face including a light incident section, an upper face and a lower face, which form a three-dimensional structure, a light reflection pattern formed on a surface of the upper face non-parallel with respect to a first boundary line formed between the light incident section and the upper face, so as to allow at least a portion of the light incident into the light incident section to be directed towards the lower face and a light redirecting means formed on the side face other than the light incident section so as to change the direction of the light, which is otherwise projected without being directed towards the lower face by the light reflection pattern, such that the light is directed towards the lower face.

In another aspect, there is provided a liquid crystal display device comprising a light guide plate including a body having a side face including a light incident section, an upper face and a lower face which form a three-dimensional structure, and a light reflection pattern having at least one bending portion having an angle at the upper face in such a manner that a light incident into the light incident section is reflected from the upper face towards the lower face, and an advancing direction of the light is converted towards an interior of the light guide plate, a lamp assembly disposed at the light incident section opposite the bending portion so as to supply the light to the upper face of the light guide plate and a liquid crystal display panel disposed facing the lower face so as to display an image by controlling a transmissivity of the light.

In still another aspect, there is provided a liquid crystal display device comprising a light guide plate including a body having a side face including a light incident section, an upper face and a lower face which form a three dimensional structure, a light reflection pattern formed on a surface of the upper face non-parallel with respect to a first boundary line formed between the light incident section and the upper face, so as to allow at least a portion of the light to be directed towards the lower face, and a light redirecting means formed on a second side section of the side face other than the light incident section so as to change the direction of the light, which is otherwise projected without being directed towards the lower face by the light reflection pattern, such that the light is directed towards the lower face, a lamp assembly disposed facing the light incident section and including a lamp of which one end of an effective light emitting area matches a second boundary line at which the second side section is met with the light incident section, and a liquid crystal display panel positioned below the light guide plate and including pixel electrodes aligned in a matrix form such that an aligning direction of the pixel electrodes is not parallel to an extending direction of the light reflection pattern.

In yet another aspect, there is provided a method for displaying an image in a liquid crystal display device, comprising: generating a first light having a linear light source distribution by utilizing an effective light emitting area having a first length; converting the first light into a second light having a surface light source distribution, the surface light source distribution having a second length longer than the first length, supplying the second light into a liquid crystal display panel, and supplying a third light into the liquid crystal display panel by changing the direction of the third light, which is to be leaked while the first light is being converted into the second light, into a direction of the second light; and generating a fourth light having a modulated light transmissivity and wave length by allowing the second and third lights supplied towards the liquid crystal display panel to pass through a liquid crystal and a color pixel.

According to the present invention, the liquid crystal display device can display information with a uniform brightness when the quantity of the light is insufficient or even when the light does not exist. In addition, the liquid crystal display device can prevents the moiré phenomenon, so a high quality display can be achieved.

BRIEF DESCRIPTION OF THE DRAWINGS

The above and other advantages of the present invention will become more apparent by describing in detail exemplary embodiments thereof with reference to the attached drawings in which:

FIGS. 4B is a plan view showing an effective display area of a conventional liquid crystal display device, in which the effective area is divided, by means of a light guide plate, into three areas having a different brightness, respectively;

DETAILED DESCRIPTION OF THE INVENTION

Hereinafter, a light guide plate, a liquid crystal display device and a method for displaying pictures in the liquid crystal display device according to the exemplary embodiment of the present invention will be described in detail.

According to the present invention, a structure of the light guide plate and a relationship between a lamp and the light guide plate are changed so as to prevent the moiré phenomenon created due to a specific relationship between a light reflection pattern of the light guide plate required for displaying information in a dark place and pixel electrodes and so as to solve the brightness variation caused by the light reflection pattern.

The light guide plate will be firstly described. Then, the liquid crystal display device including the light guide plate, the lamp and a liquid crystal display panel assembly, and the method for displaying pictures in the liquid crystal display device will be described, in sequence.

Figure 5:
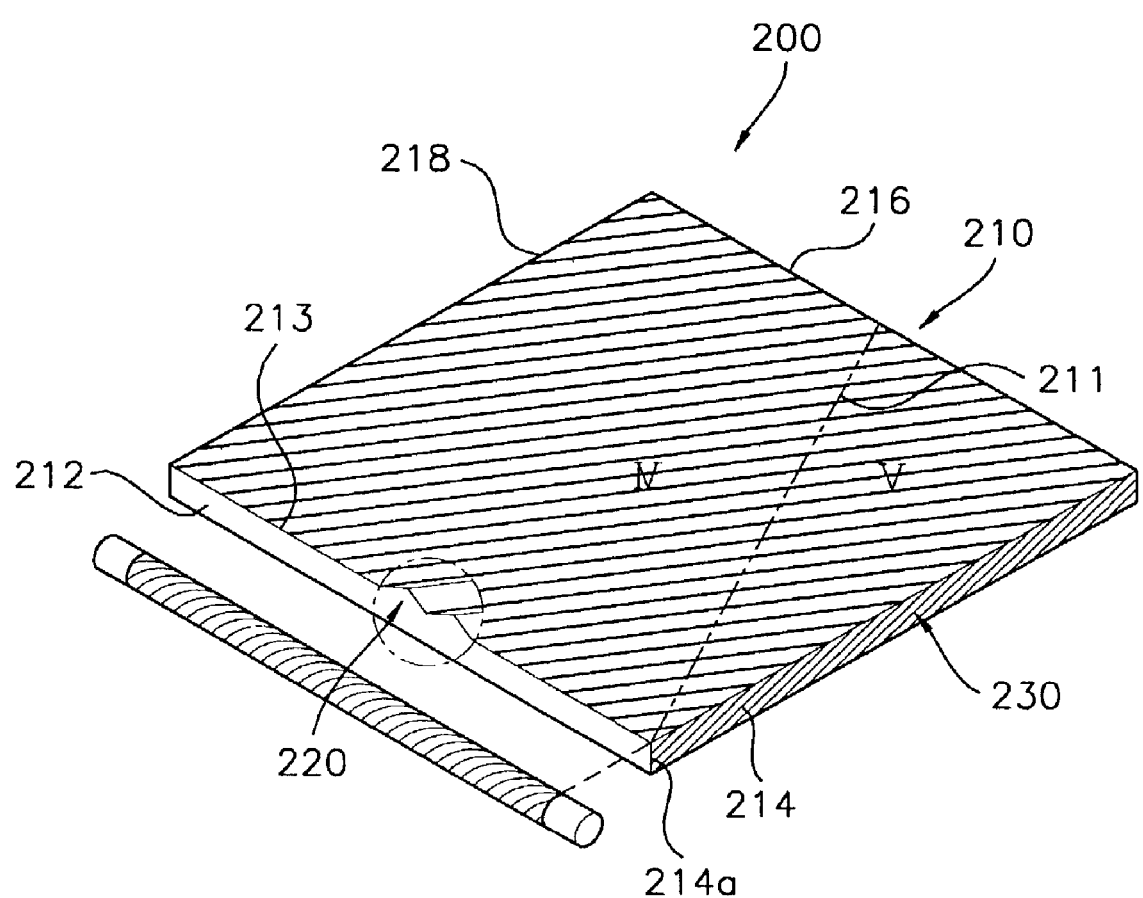
FIG. 5 is a perspective view showing the structure of a light guide plate according to a first embodiment of the present invention.

FIG. 5 is a perspective view showing the relationship between the light guide plate and the lamp according to one embodiment of the present invention.

Referring to FIG. 5, a light guide plate 200 includes a body 210, a light reflection pattern 220 and a light redirecting face 230.

In detail, the body 210 has a hexagonal plate shape having a rectangular upper surface. The reason for forming the body 210 in the hexagonal plate shape is that an effective display area of a liquid crystal display panel assembly, which will be described below, has a rectangular shape. That is, the shape of the body 210 can be varied depending on the shape of the liquid crystal display panel assembly.

Figure 6:
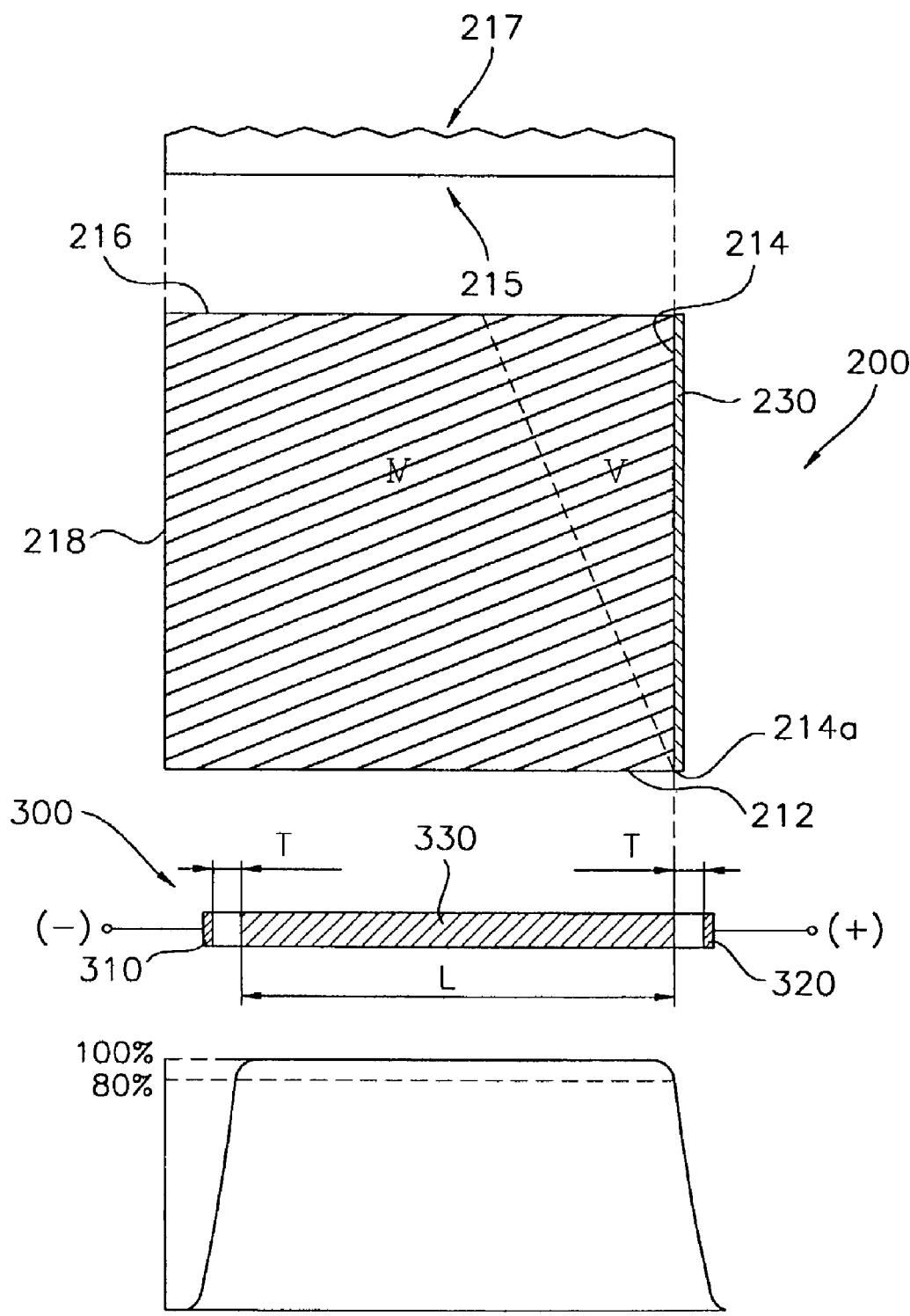
FIG. 6 is a schematic view showing a face of a light guide plate, a relationship between a lamp and the light guide plate, and an effective display area of the lamp according to one embodiment of the present invention.

More particularly, the body 210 of the present invention includes four side faces 212, 214, 216 and 218, an upper face 217 (FIG. 6), and a lower face 215 (FIG. 6).

The light having a linear light source distribution is converted into the light having a surface light source distribution, and the length (equal to 'L' of FIG. 6) of the linear light source distribution is less or equal to the length of the surface light source distribution. The length of the surface light source distribution is about the same as the length of the second side face 212 of the light guide plate 200.

In order to convert a light having a linear light source type optical distribution into a light having a surface light source type optical distribution in the body 210 having four side faces 212, 214, 216 and 218, the upper face 217, and the lower face 215, the light is incident into at least one of four side faces 212, 214, 216 and 218 of the body 210.

Hereinafter, at least one of four side faces 212, 214, 216 and 218, through which the light having the linear light source type optical distribution is incident, is defined as a first side face. In this embodiment, the first side face is represented by the reference numeral 212.

A portion of the first face 212 necessarily meets the upper face 217 of the body 210. In this embodiment, an edge portion at which the first face 212 meets the upper face 217 is defined as a first boundary line 213.

The first boundary line 213 is a base line in determining an extending direction of the light reflection pattern formed on the upper surface 217 of the body 210.

The light reflection pattern 220 is formed on the upper face 217 of the body 210. The light reflection pattern 220 includes V-shaped grooves continuously formed at the upper face 217 of the body 210.

The extending direction of the light reflection pattern 220 is not parallel with the first boundary line 213. The light reflection pattern 220 is tilted at an angle up to 22.5 degrees with respect to the first boundary line 213. According to one embodiment of the present invention, the light reflection pattern 220 is tilted at an angle of 22.5 degrees with respect to the first boundary line 213.

The reason for tilting the light reflection pattern 220 at the angle up to 22.5 degrees with respect to the boundary line 213 is to reduce the moiré phenomenon by allowing the light reflection pattern 220 to be tilted from pixel electrodes of the liquid crystal display panel assembly, which will be explained below.

The pixel electrodes of the liquid crystal display panel assembly are aligned parallel with the first boundary line 213.

In a state that the light reflection pattern 220, which is tilted with respect to the first boundary line 213, is formed at the upper face 217 of the body 210, if lights having different incident angles from each other are incident into the light reflection pattern 220 through the first side face 212 of the body 210, a portion of the light is reflected from the light reflection pattern 220 and is directed towards a liquid crystal display panel, and the remaining portions of the light is directed to a side of the body 210 without being reflected towards the liquid crystal display panel.

Accordingly, a bright area IV, a dark area V and a boundary line 211 are formed in the body 210 shown in FIG. 5.

The reason is that the refection angle of the light is varied at various portions of the light reflection pattern 220. Particularly, a portion of light arriving at the bright area IV is reflected in upward/downward directions about the upper face of the body 210 formed with the light reflection pattern 220. However, the remaining portions of light arriving at the dark area V is reflected in left/right directions.

The side face of the body 210, at which the light reflected in the left/right directions is arrived, is defined as a second side face. In FIG. 5, the second side face is represented by the reference numeral 214.

As a result, when the light reflection pattern 220 is arranged non-parallel to the align direction of the pixel electrodes so as to prevent the display quality from being lowered by the moiré phenomenon, the brightness variation is created.

In order to reduce the brightness variation, the present invention reduces the light leaked through the second side face 214.

For this reason, the light redirecting face 230 is formed at the second side face 214 so as to reduce the leakage of the light at the second side face 214.

The light redirecting face 230 can be incorporated in the light guide plate in several forms.

For example, as shown in FIG. 6, the light redirecting face 230 includes a reflection mirror which is attached to the second side face 214 for reflecting the light. The light redirecting face 230 can improve the brightness in the dark area V by re-reflecting the light to be lost from the second side face 214 towards the liquid crystal display panel assembly by using the reflection mirror. The reflection mirror may have a laminated sheet form.

Figure 7:
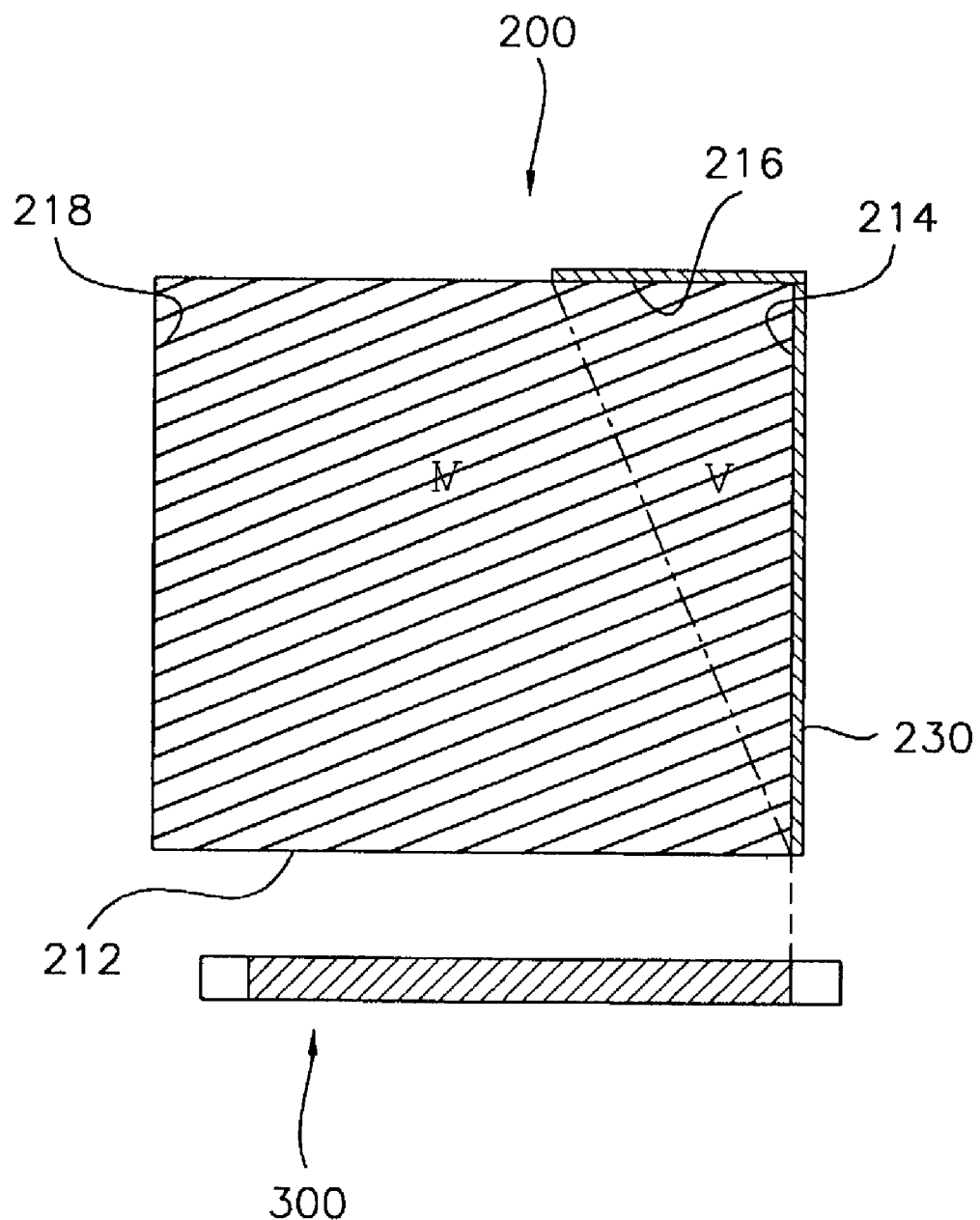
FIG. 7 is a plan view of a light guide plate according to a second embodiment of the present invention.

As shown in FIG. 7, the light redirecting face 230 can be formed on the entire area of the second side face 214, or can be extended to a portion of a side face 216 that is included in the dark area and opposite the first side face 212.

The light redirecting face 230 can be selectively formed at the remaining side face 218.

Figure 8:
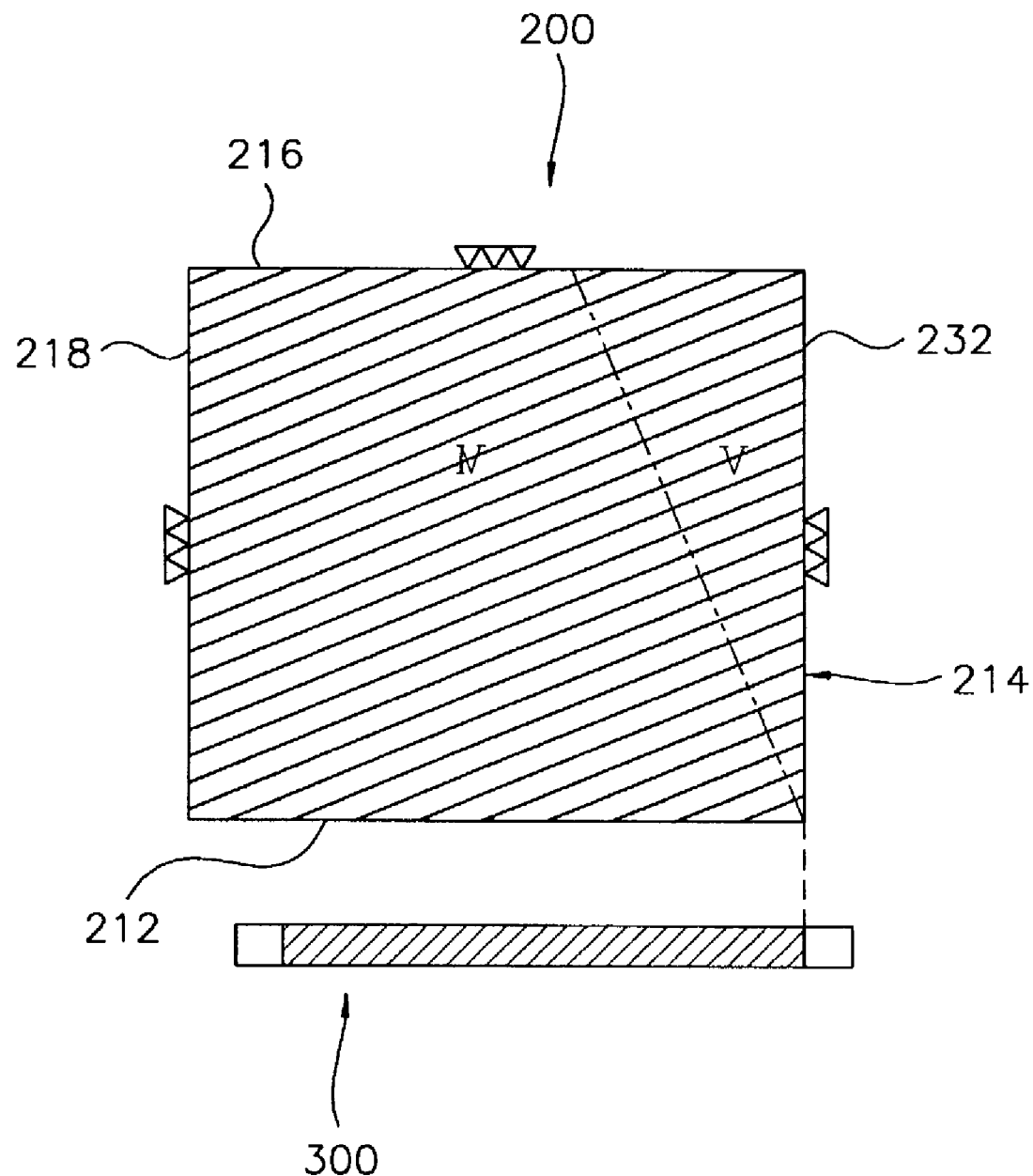
FIG. 8 is a plan view of a light guide plate according to a third embodiment of the present invention.

Alternatively, as shown in FIG. 8, a light redirecting face 232 is formed by polishing a surface of the second side face 214 for reflecting the light. The polished second side face 214 can reflects the light to be leaked towards the liquid crystal display panel assembly, thereby improving the brightness in the dark area V.

The light redirecting face 232 can be formed at side faces 214, 216 and 218 except the first side face 212 or at a portion thereof so as to display information with an improved brightness.

Thus, the light guide plate 200 enables the liquid crystal display device employing thereof to display information in a dark place, provides a uniform brightness through out an entire effective display area, prevents the moiré phenomenon, and solves the brightness variation, thereby enabling a high-quality display function.

Figure 9:
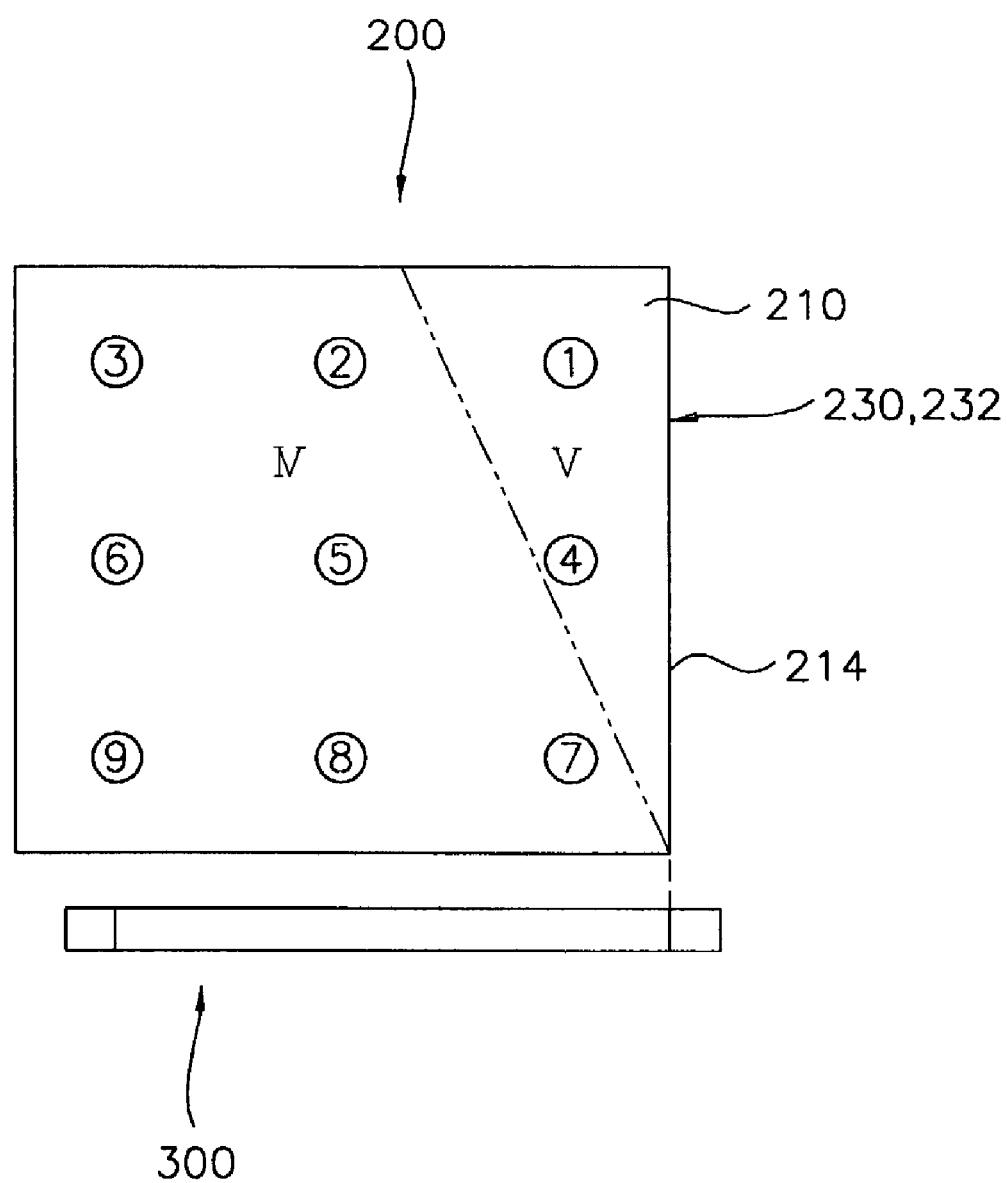
FIG. 9 is a view showing measuring points for measuring a brightness distribution in a light guide plate.
Figure 10:
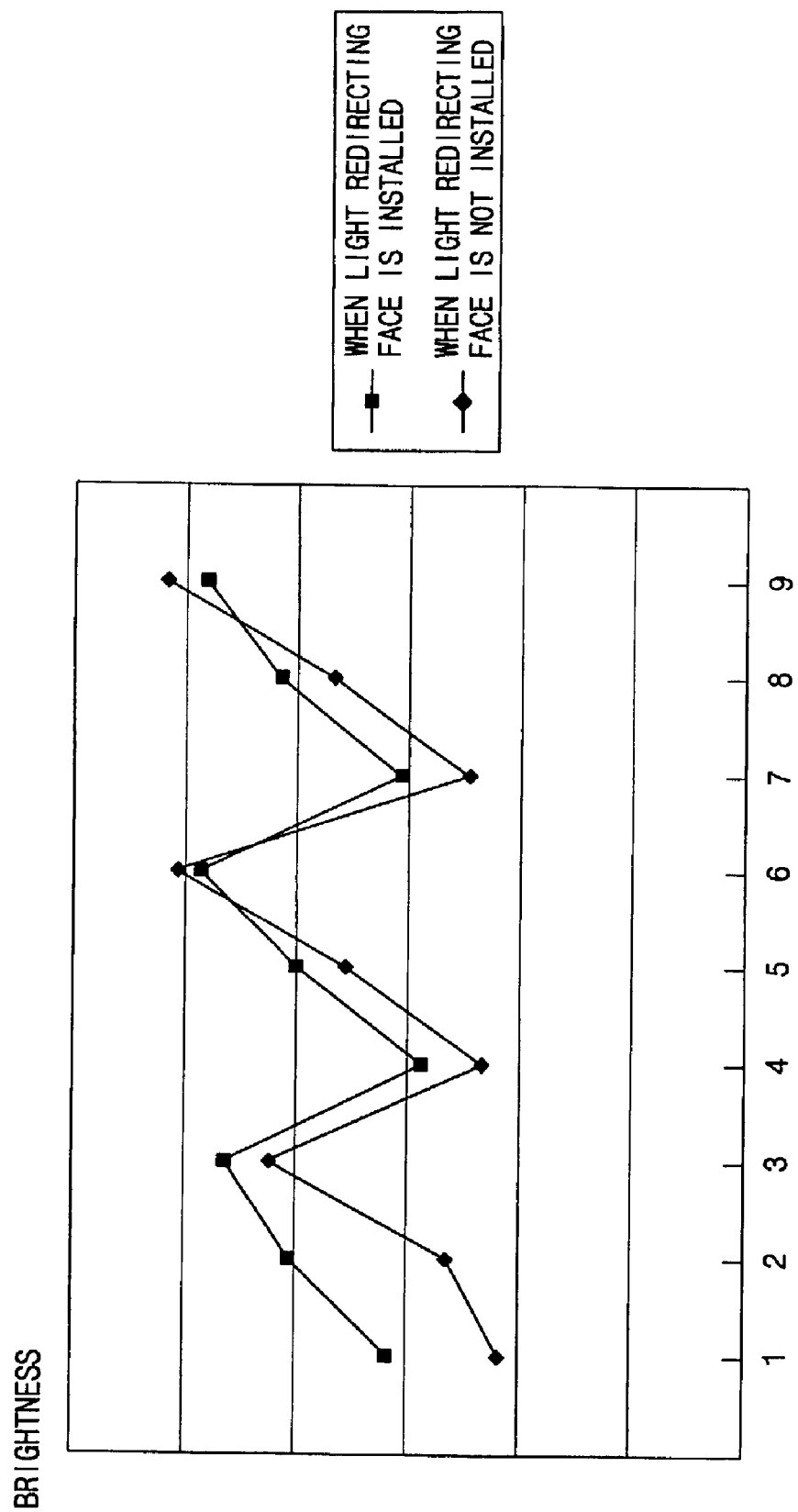
FIG. 10 is a graph showing a test result of FIG. 9.

FIGS. 9 and 10 respectively show measuring points for the brightness distribution and a graph representing the variation of the brightness when the light redirecting face 230 or 232 is formed at the second side face 214 of the body 210.

The brightness is measured using a light guide plate having a light redirecting face at a second side face of the body and a light guide plate without the light redirecting face for comparison. In addition, the brightness is measured at nine measuring points having a constant interval therebetween. An angle between the light reflection pattern 220 formed on the body 210 and the first boundary line 213, and the first side face 212, into which the light is incident, are identically set in two tests.

FIG. 10 shows the test result. Referring to FIG. 10, the brightness is improved when the light redirecting face is installed at the second side face 214.

In addition, measuring points $\hat{1}$, $\hat{4}$ and $\hat{7}$ represent a brightness lower than that of other measuring points when the light redirecting face is formed at the second side face 214.

Figure 11:
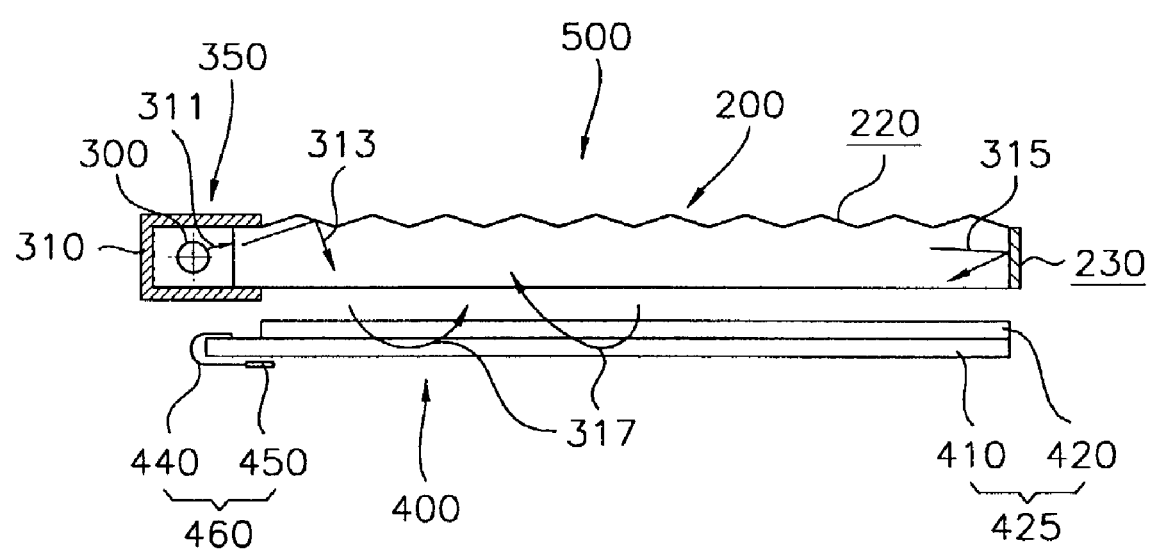
FIG. 11 is a schematic view of a liquid crystal display device including a light guide plate according to one embodiment of the present invention.

As shown in FIG. 11, the light guide plate 200 capable of achieving the high-quality display brightness by using the light redirecting face for improving the brightness is assembled with a lamp assembly 350 and a liquid crystal display panel assembly 400, thereby completing a light crystal display device 500.

The lamp assembly 350 includes a lamp 300 and a lamp reflector 310 for projecting the light generated in the lamp 300 in one direction.

Various kinds of lamps 300, such as a point light source type LED and a linear light source type cold cathode fluorescent lamp (CCFL), can be used. In the present embodiment, the cold cathode fluorescent lamp is used. The cold cathode fluorescent lamp generates a white light similar to the sunlight, and has a low calorific value when generating the light, so that the variation in a physical characteristic of a liquid crystal can be reduced and the life span is expanded. Hereinafter, the cold cathode fluorescent lamp is simply referred to the lamp 300.

As shown in FIG. 6, the lamp 300 includes a first electrode 310, a second electrode 320 and a lamp tube 330.

The first and second electrodes 310 and 320 are coupled to both ends of the lamp tube 330, which is coated at an inner wall thereof with fluorescent material. Mercury is accommodated in the lamp tube 330 sealed by the first and second electrodes 310 and 320.

A boosted AC power is applied to the first and second electrodes 310 and 320 of the lamp through an inverter, so electrons are discharged from one of the first and second electrodes 310 and 320 and shifted into the other of the first and second electrodes 310 and 320. The electrons shifting at a high speed make contact with mercury electrons, thereby generating an ultraviolet ray. The ultraviolet ray excites the fluorescent material coated at the inner wall of the lamp tube 330, so the visible ray is generated.

The brightness is not uniformly formed over the entire area of the lamp. For this reason, a certain standard should be set in determining the characteristic of the lamp 300. An "effective light emitting area" is used as the standard.

The effective light emitting area L is defined as an area, which generates the brightness in 80% or higher of a maximum brightness of the light generated from the lamp 300.

Referring to a graph shown in FIG. 6, the brightness is lowest at portions adjacent to the first and second electrodes 310 and 320 of the lamp 300 and increases as reaching to a center of the lamp 300. The highest brightness is generated at the center of the lamp 300.

For this reason, the effective light emitting area L is formed between positions remote from the first and second electrodes 310 and 320 of the lamp 300.

That is, the lamp 300 is divided into the effective light emitting area L and a non-effective light emitting area T, and the light generated from the effective light emitting area L is only used for displaying information.

This means that the non-effective light emitting area T can may have an adverse influence on the display function depending on the position-relationship between the lamp 300 and the light guide plate 200.

Figure 1:
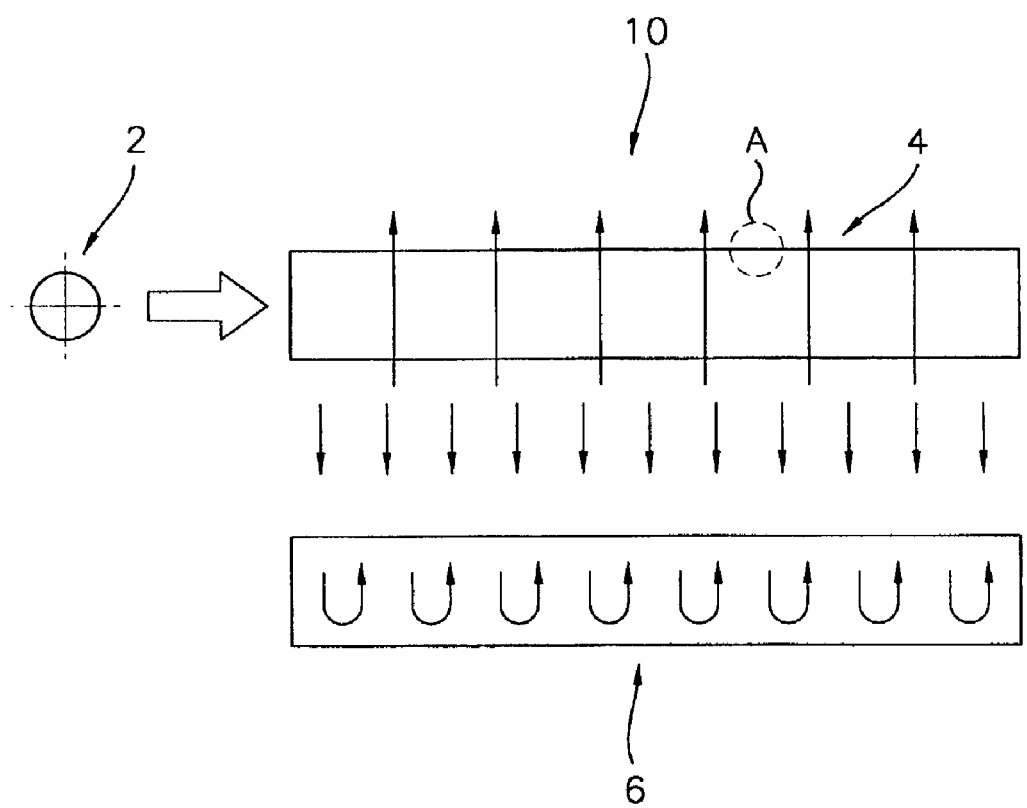
FIG. 1 is a schematic view of a conventional liquid crystal display device.
Figure 2:
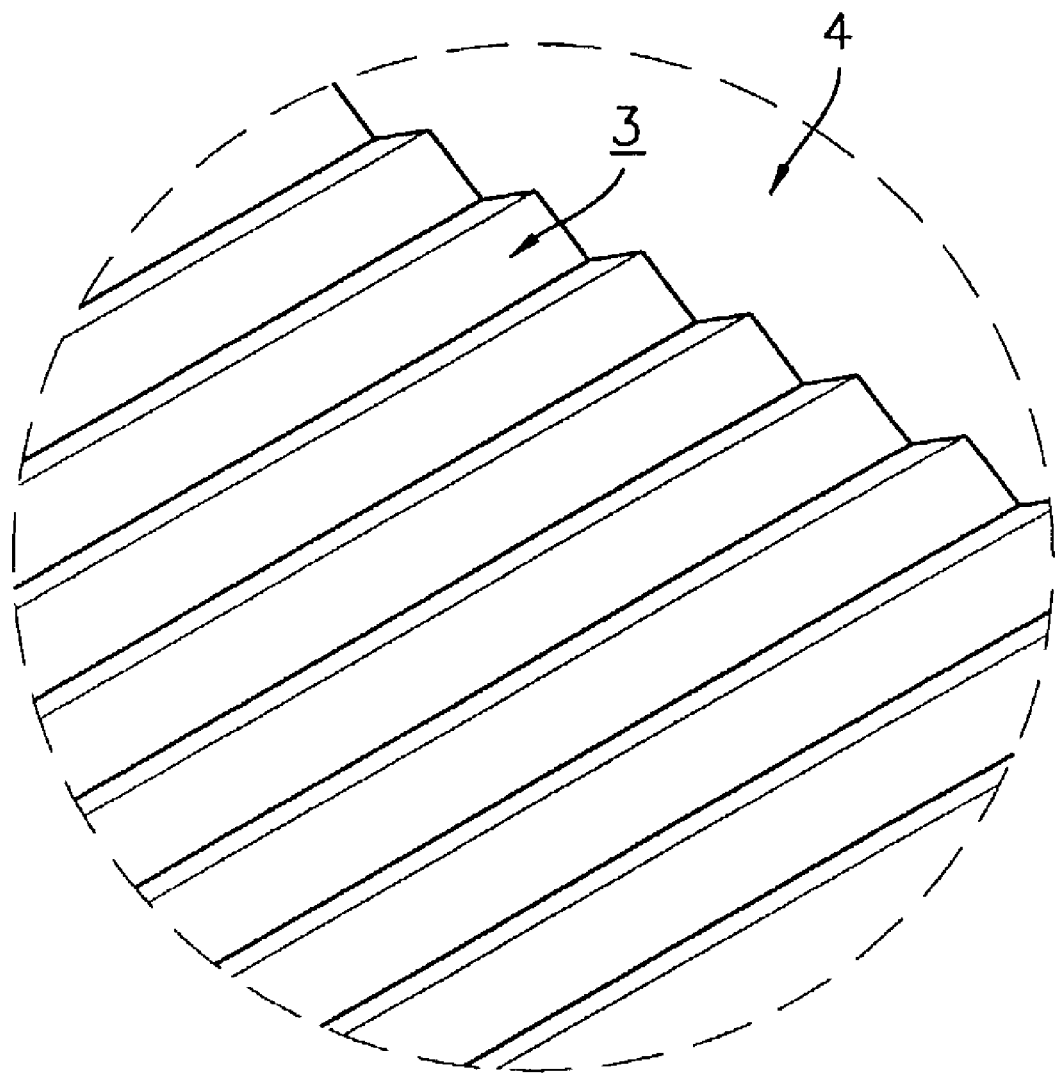
FIG. 2 is an enlarged view of "A" portion shown in FIG. 1.
Figure 3:
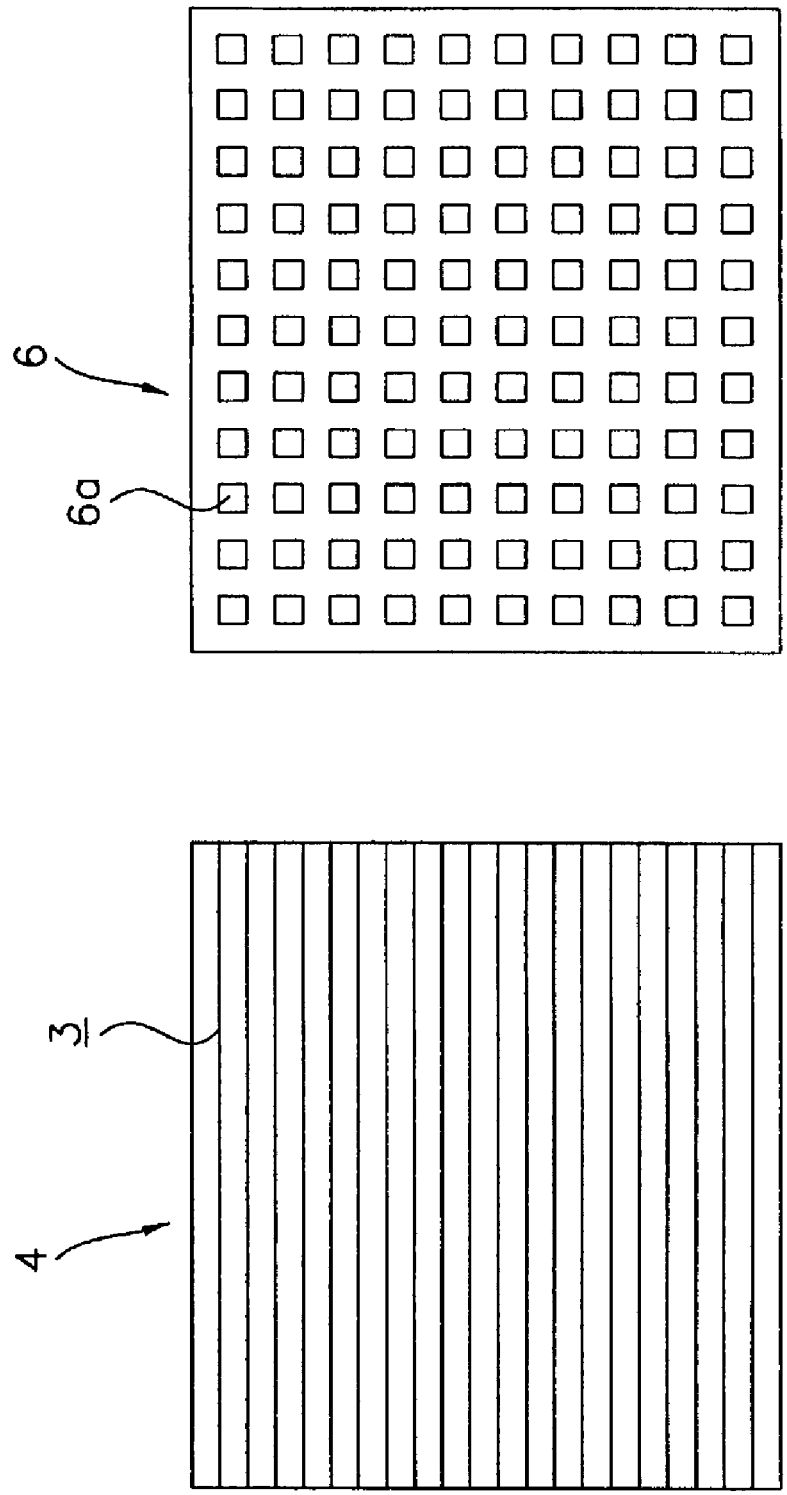
FIG. 3 is a plan view showing light reflection patterns formed on a light guide plate of a conventional liquid crystal display device and an alignment of pixel electrodes of a liquid crystal display panel.
Figure 4A:
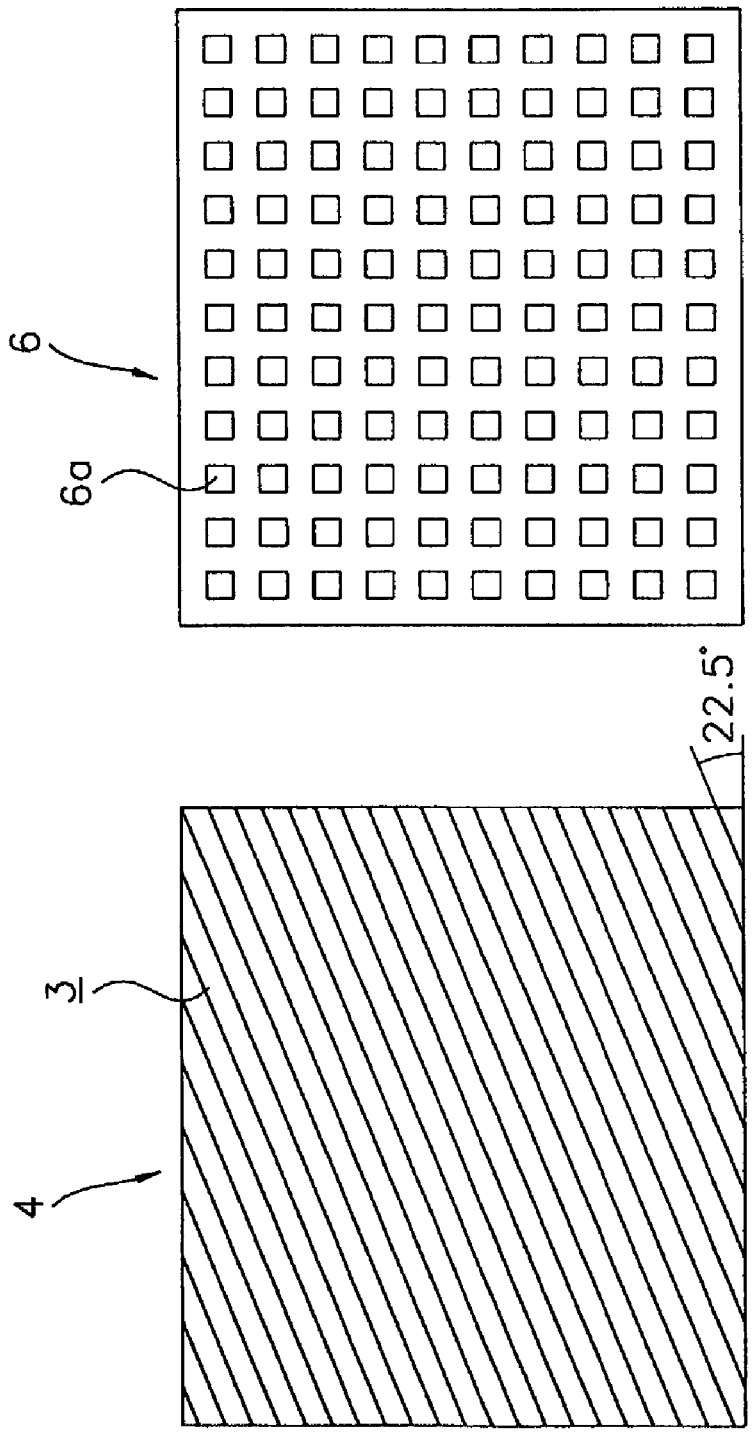
FIG. 4A is a plan view of the light reflection patterns of a light guide plate and the pixel electrodes of a liquid crystal display panel, which are aligned such that the moiré phenomenon can be prevented.

Both ends of a conventional lamp are simply matched with both ends of a first side face 4a of a light guide plate 4 without considering the effective light emitting area as shown in FIG. 4B.

If both ends of the conventional lamp are simply matched with the both ends of the first side face 4a of the light guide plate 4 without considering the effective light emitting area, a boundary area 11 is created as shown in FIG. 4B.

A width of the boundary area 11 increases in proportion to a distance between the lamp 2 and an end of the effective light emitting area. In extreme case, a user can visually detects the boundary area 11, so the display quality is lowered.

The removal of the boundary area 11 and the reduction of the width of the boundary area 11 are determined depending on the position of the effective light emitting area of the lamp 2.

By setting the length of the effective light emitting area of the lamp to be identical to the overall length of the lamp, the width of the boundary area 11 can be minimized. However, it is impossible to manufacture such lamp.

In order to solve the above problem, the present invention precisely adjusts the position of the lamp, thereby reducing the width of the boundary area 11.

Figure 12:
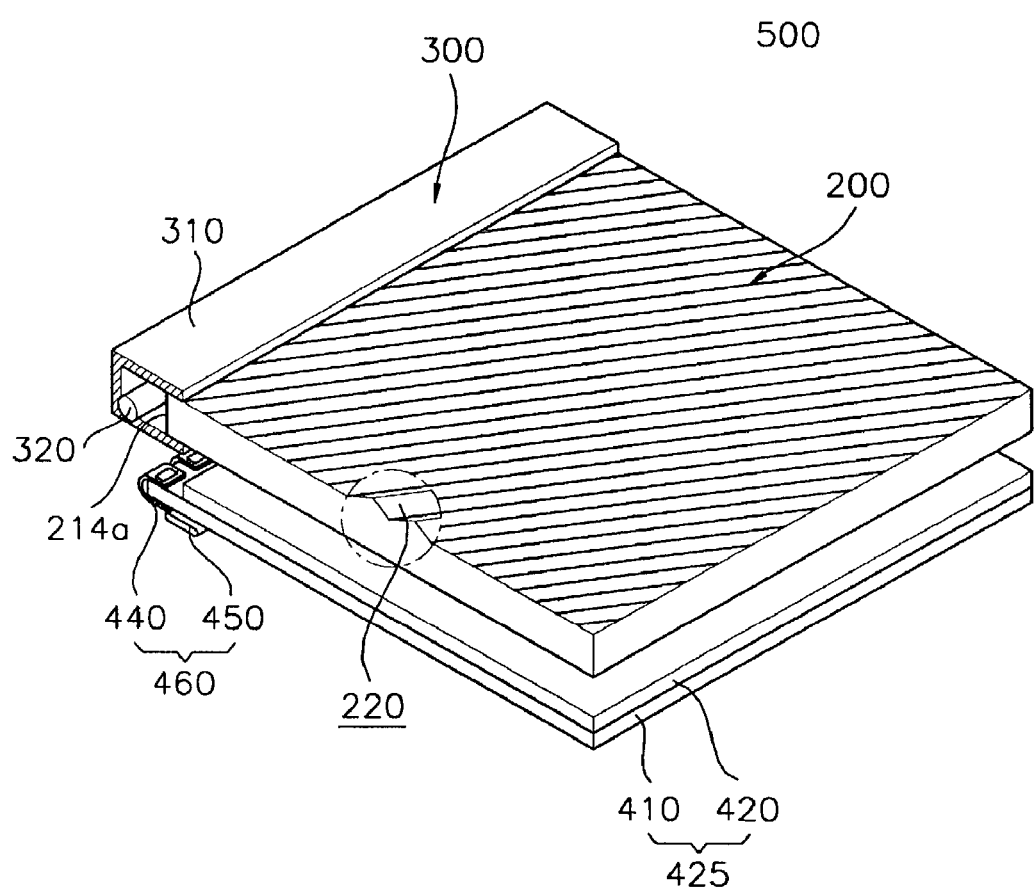
FIG. 12 is a perspective view of a liquid crystal display device shown in FIG. 11.

In detail, referring to FIG. 6, the first side face 212 is adjacent to the side face 218 included in the bright area IV and the second side face 214 included in the dark area V. The boundary at which the second side face 214 is met with the first side face 212 is defined as a second boundary line 214a. The second boundary line 214a is shown in FIGS. 5, 6 and 12.

One end of the effective light emitting area L of the lamp 300 is at least aligned at the second boundary line 214a of the body 210, or extended beyond the second boundary line 214a by about 10 mm or less. Thus, the boundary area, which lowers the display features, can be reduced or removed.

The light generated from the lamp 300 is uniformly converted through the light guide plate 200 and is supplied to the liquid crystal display panel assembly 400, thereby performing the display function.

Therefore, the liquid crystal display panel assembly 400 as well as the light guide plate 200 and the lamp assembly 350 needs to be optimized for precisely displaying information.

Figure 13:
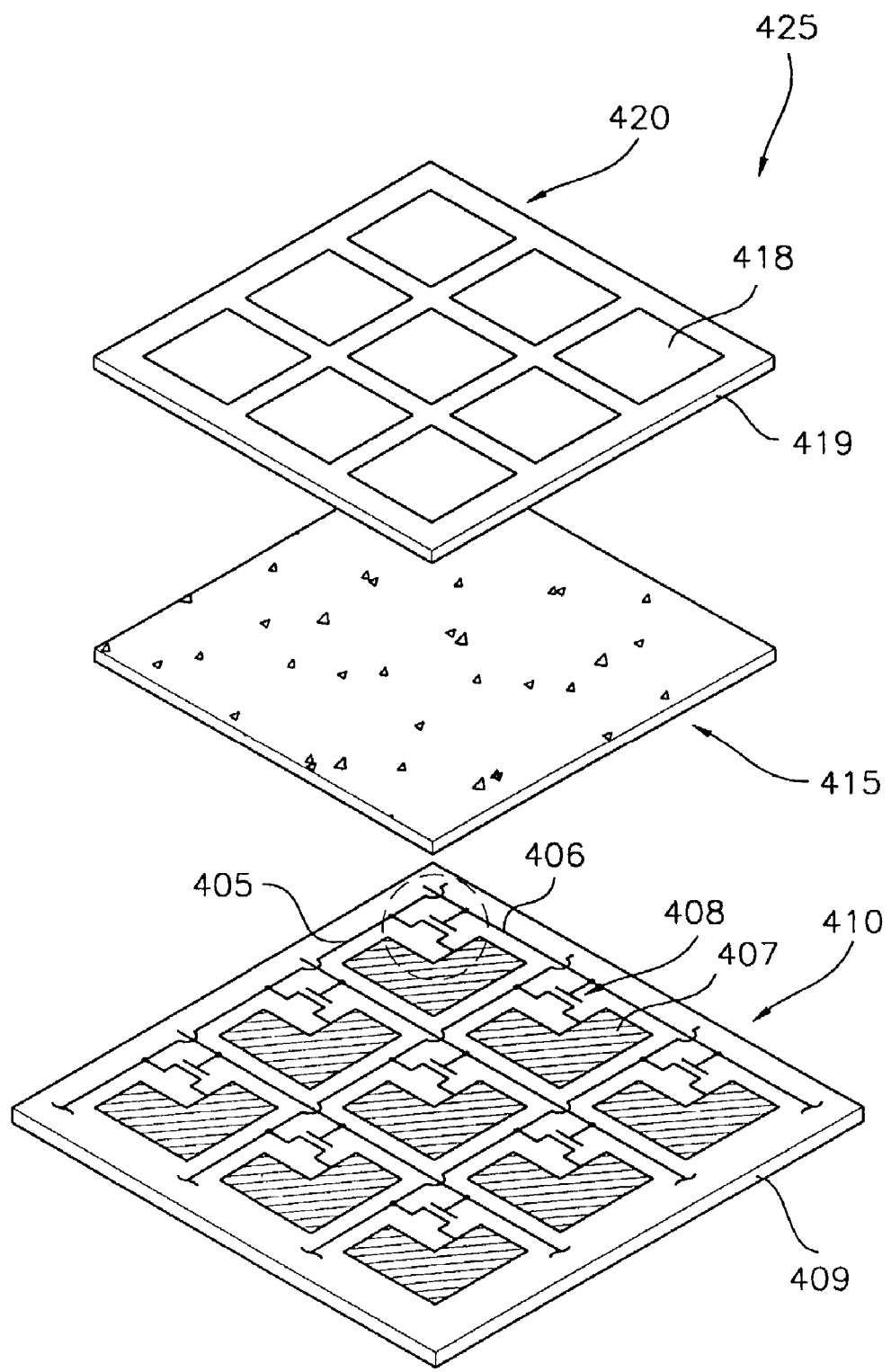
FIG. 13 is an exploded perspective view of a liquid crystal display device according to one embodiment of the present invention.

Referring to FIGS. 11 to 13, the liquid crystal display panel assembly 400 includes a liquid crystal display panel 425 and a driving device 460.

The liquid crystal display panel 425 has a color filter substrate 420, a liquid crystal 415 and a TFT substrate 410.

The TFT substrate 410 includes thin film transistors 408, pixel electrodes 407 and signal lines 405 and 406 formed on a glass substrate 409.

Figure 14:
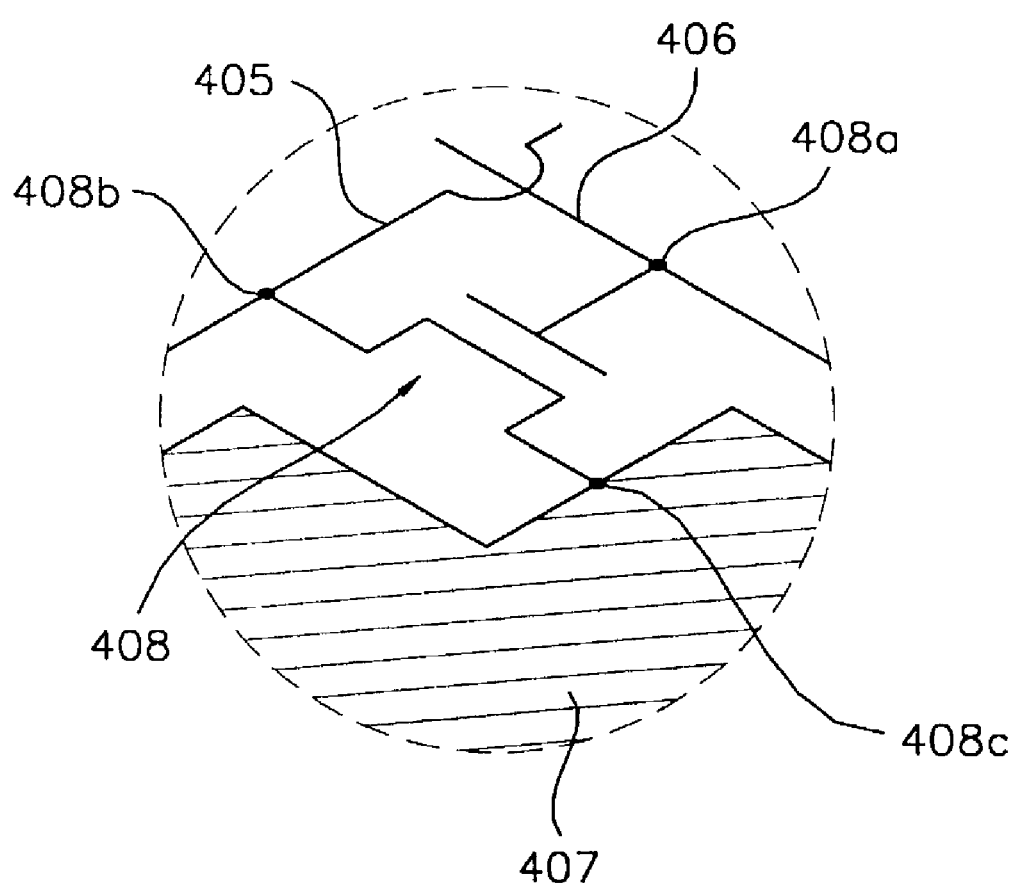
FIG. 14 is an enlarged perspective view of a thin film transistor shown in FIG. 13.

A plurality of thin film transistors 408 are formed on the glass substrate 409 in a matrix form. As shown in FIG. 14, each thin film transistor 408 has a gate electrode 408a, a drain electrode 408c and a source electrode 408b.

A gate line 406 is commonly connected to the gate electrode 408a of the thin film transistors aligned in a column of the matrix type thin film transistors 408.

A data line 405, which is the remaining signal line, is commonly connected to the source electrode 408b of the thin film transistors aligned in a row of the matrix type thin film transistors 408.

An insulation layer is formed on upper surfaces of all of the thin film transistors 408. A contact hole is formed on an upper surface of the insulation layer so as to expose the drain electrode 408c and the pixel electrodes 407 are formed on the upper surface of the insulation layer so as to be connected to the contact hole. The pixel electrode 407 is made of a metal having a high reflectivity.

Figure 15:
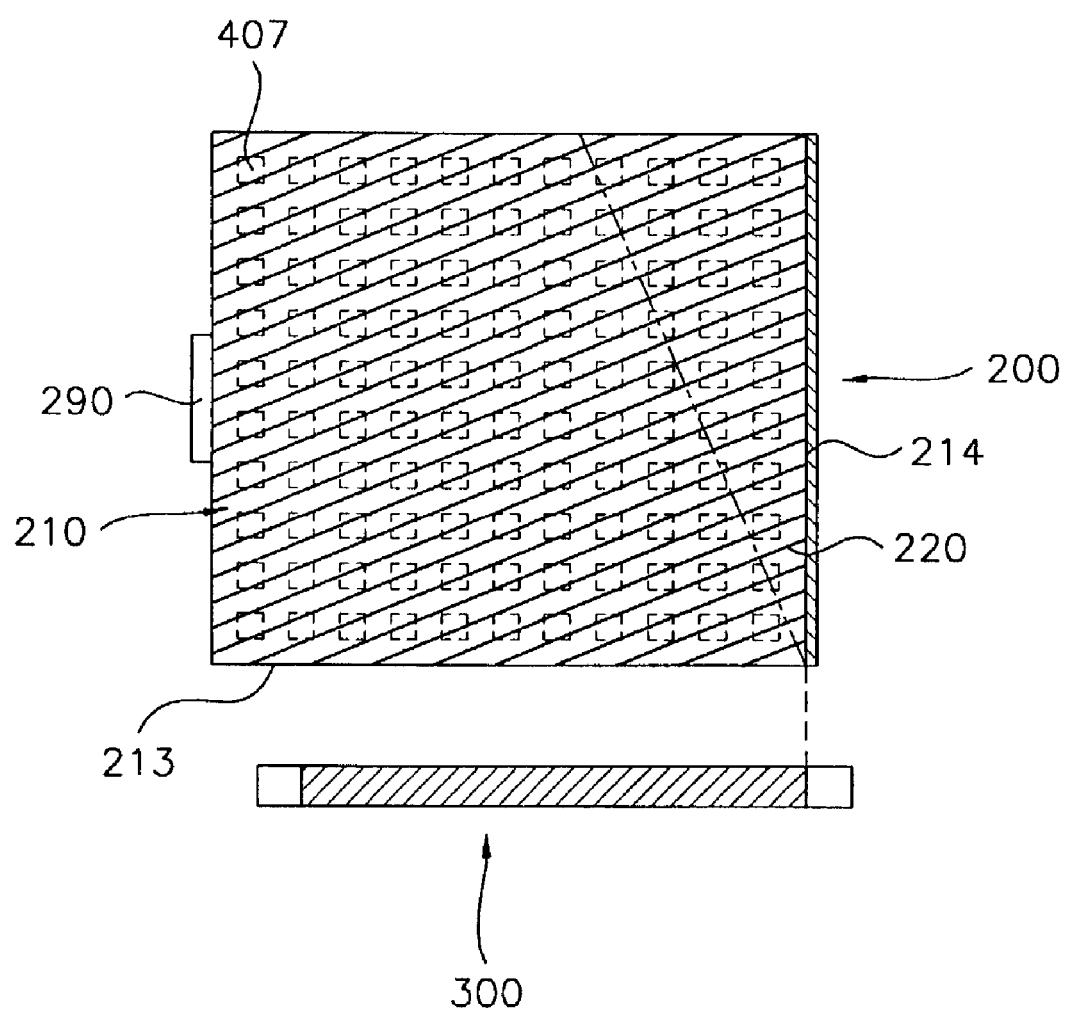
FIG. 15 is a plan view showing a parting line and a relationship between pixel electrodes of a liquid crystal display panel and light reflection patterns of a light guide plate according to one embodiment of the present invention.

As shown in FIG. 15, columns of the matrix type pixel electrodes 407 are parallel to the first boundary line 213 of the body 210.

Thus, the pixel electrodes 407 are tilted from the light reflection pattern 220 formed on an upper surface of the body 210 at an angle of up to 22.5 degrees.

The color filter substrate 420 includes R.G.B color pixels 418 formed on a glass substrate 419 opposite the pixel electrodes 407 and a common electrode (not shown).

In a state that the color filter substrate 420 is placed over the TFT substrate 410 in such a manner that R.G.B pixels 419 and pixel electrodes 407 are inter-aligned, the liquid crystal is injected between the color filter substrate 420 and the TFT substrate 410.

As shown in FIGS. 11 and 12, the driving device 460 is installed in the liquid crystal panel 425 having the above structure so as to turn-on the thin film transistor at a predetermined time and so as to apply a predetermined power to the pixel electrodes. The driving device 460 includes a printed circuit board 450 and a tape carrier package 440.

Hereinafter, the method for displaying pictures in the liquid crystal display device according to one embodiment of the present invention will be described with reference to the drawings.

Referring to FIG. 11, the light having a linear light source type optical distribution, which is radially generated from the lamp 300, is focused in one direction by the lamp reflector 310 and projected out of the lamp reflector 310. The light projected through the lamp reflector 310 is defined as a first light 311.

Then, the projected first light 311 having the linear light source type optical distribution is converted to have the surface light source type optical distribution. In order to prevent the moiré phenomenon causing the variation of the optical distribution, the advancing direction of the first light 311 projected from the lamp reflector 310 is changed, so that the first light 311 is supplied to the liquid crystal display panel assembly 400.

The advancing direction of the first light 311 is parallel with the liquid crystal display panel assembly 400 when it is projected from the lamp reflector 310. However, the first light 311 is directed towards the liquid crystal display panel assembly 400 while the optical distribution is being converted.

In addition, the first light 311 advancing toward the liquid crystal display panel assembly 400 is non-parallel with the aligning direction of the pixel electrodes 407 formed on the liquid crystal display panel assembly 400. The light reflected from the light reflection pattern 220 and directed to the liquid crystal display panel assembly 400 is defined as a second light 313.

A portion of the first light 311 has an advancing direction different from that of the second light 313. That is, the portion of the first light 311 is not directed towards the liquid crystal display panel assembly 400.

That is, the portion of the first light 311 is leaked from the light guide plate, thus the brightness is lowered. The light leaked from the light guide plate is defined as a third light 315.

In order to avoid the decrease in the brightness due to the third light 315, the direction of the third light 315 is matched with the direction of the second light 313 by using the light redirecting face 230 installed or formed in the advancing route of the third light 315.

Then, the second and third lights 313 and 315 reach the pixel electrodes 407 of the liquid crystal display panel assembly 400. After being reflecting from the liquid crystal display panel assembly 400, the second and third lights 313 and 315 pass through the aligned liquid crystal 415, so that the light transmissivity of the light is adjusted. The light having the adjusted light transmissivity and wavelength is defined as a fourth light 317. The fourth light 317 is incident into eyes of a user, so the user can recognize information included in the fourth light 317.

As shown in FIG. 15, a parting line 290 is inevitably formed in the light guide plate 200, since the light guide plate 200 is manufactured through a molding process. If the parting line 290 is formed at the second side face 214, the brightness variation in the dark area is more increased. Accordingly, the parting line 290 is formed at side faces 216 and 218 rather than second and first side faces 214 and 212.

Figure 16:
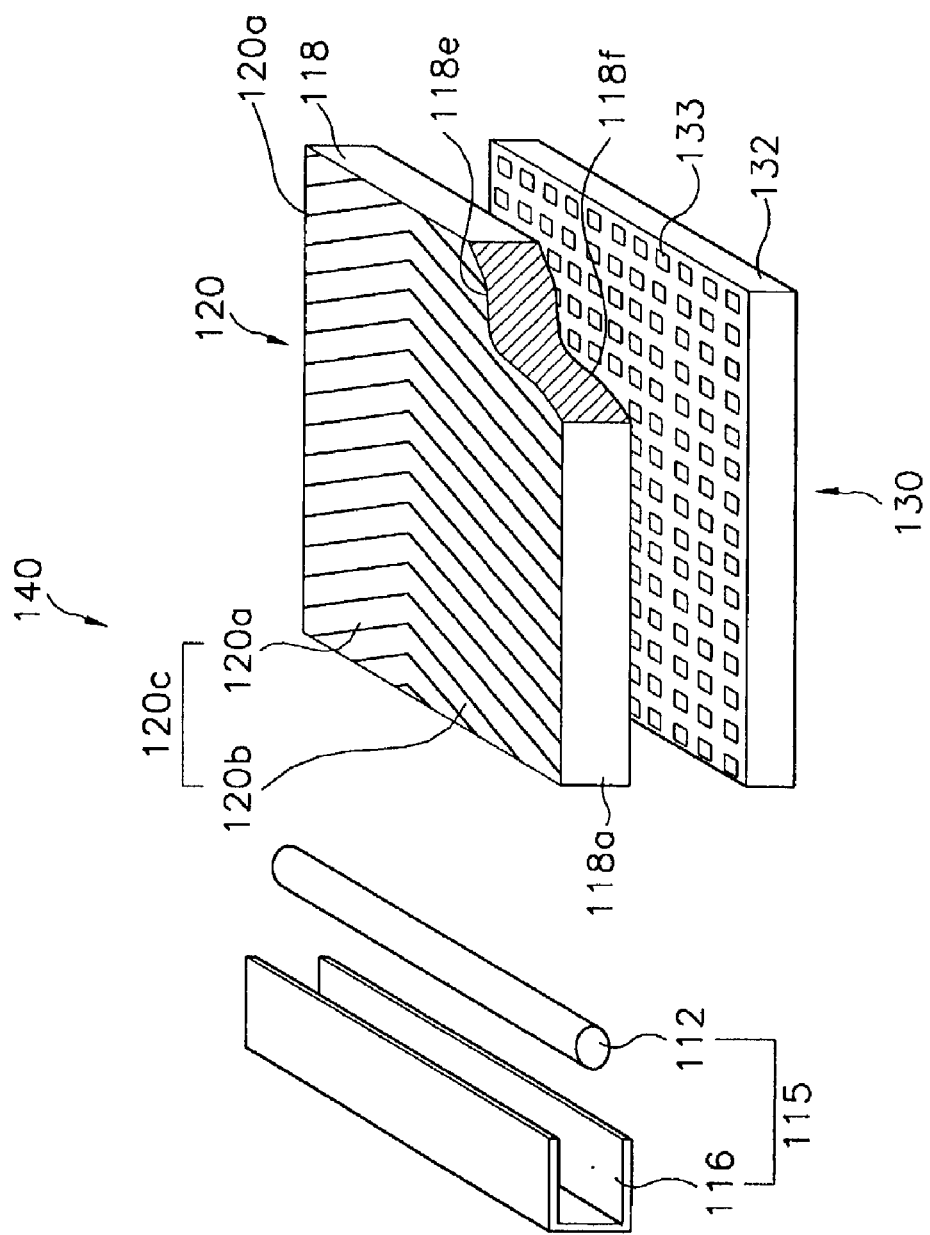
FIG. 16 is an exploded perspective view of a liquid crystal display device according to another embodiment of the present invention.
Figure 17:
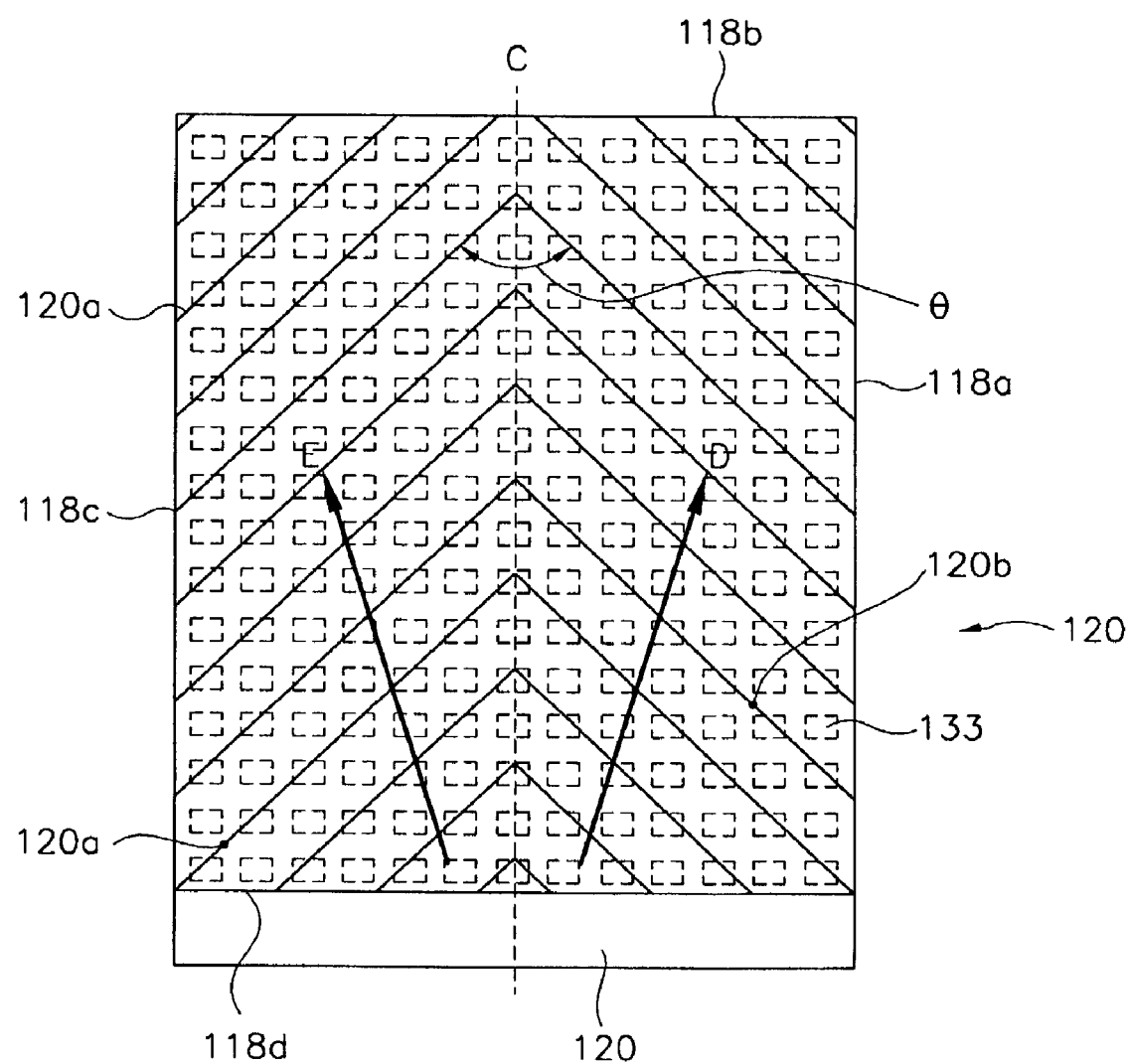
FIG. 17 is a schematic view showing a relationship between a light guide plate and pixel electrodes shown in FIG. 16.

FIGS. 16 and 17 show a liquid crystal display device according to another embodiment of the present invention.

Referring to FIGS. 16 and 17, the liquid crystal display device 140 includes a lamp assembly 115, a light guide plate 120 and a liquid crystal display panel 130.

The lamp assembly 115 and the liquid crystal display panel 130 are identical to those of the above-mentioned embodiment, so detailed description thereof will be omitted. Hereinafter, the light guide plate 120 will be described with reference to FIGS. 16 and 17. In FIG. 16, a reference numeral 116 denotes a lamp cover and a reference numeral 112 denotes a lamp.

The light guide plate 120 of the present embodiment has a cubic structure as a three dimensional structure. For example, the light guide plate 120 has a hexagonal shape as shown in FIGS. 16 and 17.

Accordingly, the light guide plate 120 has four side faces and two faces surrounded by the side faces.

Referring to FIG. 17, four side faces are represented by reference numerals 118*a*, 118*b*, 118*c* and 118*d*, respectively. Referring to FIG. 16, two faces are represented reference numerals 118*e* and 118*f*, respectively.

The face 118*f* adjacent to the liquid crystal display panel 130 is defined as a second face, and the face 118*e* opposite the second face 118*f* is defined as a first face.

A plurality of light reflection patterns 120*c* are formed on the first face 118*e*. The light reflection patterns 120*c* are continuously formed with a constant interval therebetween.

The light reflection patterns 120*c* reflects the light incident through the side face 118*d* of the light guide plate 120 towards the second face 118*f*. Also, the second function of the light reflection patterns 120*c* prevents the light reflected from the first face 118*e* from being leaked out of the light guide plate 120 by guiding the light towards a center of the light guide plate 120.

In order to reflect the light from the first face 118*e* to the second face 118*f* while preventing the light from being leaked out of the light guide plate 120, the light reflection patterns 120*c* formed on the first face 118*e* are bent at least one time at a predetermined portion thereof.

For example, as shown in FIG. 17, the light reflection patterns 120*c* respectively have one bending portion. A bending point of each of the light reflection patterns 120*c* is formed at "C" shown in a phantom line.

Light reflection patterns bent in one direction about the bending point are defined as first light reflection patterns 120*a*, and light reflection patterns bent in the other direction about the bending point are defined as second light reflection patterns 120*b*.

An angle θ between the first and second light reflection patterns 120*a* and 120*b* is an obtuse angle. By bending the light reflection patterns 120*c*, the dark area can be reduced.

The angle of each of the first and second light reflection patterns 120*a* and 120*b* may be adjusted up to about 22.5 degrees with respect to a boundary line at which the side face 118*d* to which the light is supplied from the lamp 112 is met with the first face 118*e*. The moiré phenomenon can be prevented.

Though the present invention is described with reference to the light reflection patterns 120*c* each having one bending portion, a plurality of bending portions can be formed.

As described above, the liquid crystal display device according to the present invention can display information with a uniform brightness when the quantity of the light is insufficient or even when the light does not exist. In addition, the liquid crystal display device according to the present invention can prevent the moiré phenomenon, thereby displaying information with a high quality.

While the present invention has been described in detail with reference to the exemplary embodiments thereof, it should be understood to those skilled in the art that various changes, substitutions and alterations can be made hereto without departing from the scope of the invention as defined by the appended claims.

What is claimed is:

1. A liquid crystal display device comprising:
a light guide plate including a body comprising a side face having a light incident section, an upper face and a lower face, which form a three-dimensional structure, and a light reflection pattern formed on a surface of the upper face non-parallel with respect to a boundary line formed between the light incident section and the upper face, so as to allow at least a first portion of the light to be directed towards the lower face, the light reflection pattern defining a first area and a second area, the second area is darker than the first area;
a lamp assembly facing the light incident section and including a lamp having a rod shape, the lamp having an effective light emitting area positioned at a central portion of the lamp and a non-effective light emitting area positioned at opposing end portions of the lamp, the effective light emitting area corresponding to the light incident section and at least a portion of the non-effective light emitting area of only one of the opposing end portions of the lamp extending beyond the light incident section; and
a liquid crystal display panel including pixel electrodes for reflecting the light and a liquid crystal for adjusting a transmission degree of the reflected light, the liquid crystal display panel being positioned below the light guide plate.

2. The liquid crystal display device as claimed in claim 1, wherein the light guide plate includes a first side section adjacent to the second area and an end of the effective light emitting area of the lamp corresponds to the first side section.

3. The liquid crystal display device as claimed in claim 2, wherein the end of the effective light emitting area is protruded with respect to a boundary line that is between the first side section and the light incident section by 10 mm or less.

4. The liquid crystal display device as claimed in claim 3, wherein the first side section includes a polished surface for reflecting the light toward the lower face.

5. The liquid crystal display device as claimed in claim 2, wherein the first side section includes a light redirecting means for changing the direction of a second portion of the light, the second portion not being directed towards the lower face by the light reflection pattern such that the second portion of the light is directed towards the lower face.

6. The liquid crystal display device as claimed in claim 5, wherein the light redirecting means includes a reflection mirror.

7. The liquid crystal display device as claimed in claim 1, wherein the light guide plate includes a parting line protruding from a second side section other than the light incident section and the first side section, the second side section facing one of the light incident section and the first side section.

8. The liquid crystal display device as claimed in claim 1, wherein the light reflection pattern is extended non-parallel with an aligning direction of the pixel electrodes.

9. The liquid crystal display device as claimed in claim 8, wherein the light reflection pattern is offset with respect to the aligning direction of the pixel electrodes at an angle of about 22.5 degrees or less, and the boundary line is parallel with the aligning direction of the pixel electrodes.

10. The liquid crystal display device as claimed in claim 1, wherein the non-effective light emitting area generates a brightness that is about 20% or less than the maximum brightness of the light generated from the lamp.

* * * * *